UNITED STATES PATENT OFFICE.

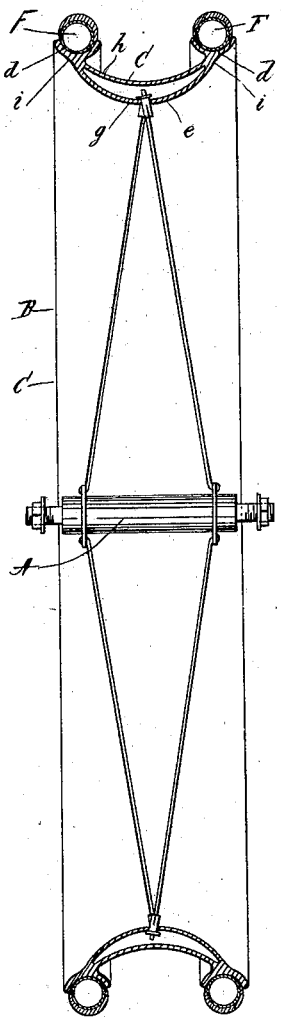

WILLIAM RICHES, OF JARVIS-BROOK, ENGLAND.

WHEEL FOR BICYCLES.

SPECIFICATION forming part of Letters Patent No. 654,673, dated July 31, 1900.

Application filed March 10, 1900. Serial No. 8,100. (No model.)

*To all whom it may concern:*

Be it known that I, WILLIAM RICHES, a subject of the Queen of Great Britain, residing at Jarvis-Brook, near Tunbridge Wells, in the county of Sussex and Kingdom of England, have invented certain new and useful Improvements in Wheels for Bicycles and the Like, of which the following is a full and complete specification, such as will enable those skilled in the art to which it appertains to make and use the same.

This invention relates to that class of wheels which are designed for use upon bicycles or similar vehicles which have a single longitudinal tread-plane for the wheels upon which it is mounted. In bicycles or the like, when such wheels which are arranged in a single longitudinal tread-plane have a single tread at the apex of their periphery, the bicycle or similar vehicle will not be sustained in an upright position when resting upon said wheels.

It is the object of my invention and improvements to provide a simple wheel especially adapted for use for bicycles or the like and which will be adapted to maintain or support the bicycle in an upright position when it is at rest.

In the accompanying drawing, which represents a transverse sectional view of a wheel embodying my improvements, A designates the hub, from which radiate the spokes B, these parts being in the main of any suitable or adapted construction.

My invention comprises an improved rim C, which may be laterally or transversely extended to a material width if desired and which, in lieu of a single seat for a tire or tread-band, is provided with two seats *d d* at its outer edges, said seats being preferably concave, and the middle or connecting portion of the rim, as at *e*, being preferably arched with respect to the spokes or concave with respect to its two outer edge seats, as shown. Said plurality of seats *d* are respectively in parallel position at the outer edges of the rim C, and the seats are thus separated a suitable or sufficient distance by the width or transverse extent of the rim, so that the tires which are carried therein will conjointly provide treads at both the outer edges of the wheel-rim, which treads will thus operate to sustain the wheel and the bicycle or other machine automatically in upright position. The seats *d* are preferably concave or of a construction corresponding to that which is usual in rims which are adapted to carry pneumatic or elastic tires, and in each of said seats is secured or mounted a suitable tire, as at F, which may be pneumatic or elastic or a solid rubber band, as desired.

The arched or concave body portion of the rim C preferably consists of an inner and outer plate *g* and *h*, respectively, which plates converge at their outer ends, as at *i*, and conjointly form the single curved end plate which forms the tire-seat *d*. The spokes B are connected with the inner plate *g*. This construction of the rim from curved metallic plates produces an especially strong and durable rim which will be most effectively adapted for the offices for which it is intended, and it will be especially strong in the span or bridge portion extending between the two supporting surfaces or treads at the outer edge of said rim.

The operation and advantages of my invention will be readily understood. Inasmuch as the wheel provides two supporting-surfaces or treads instead of only one at the center the bicycle or other vehicle or machine will be automatically supported in upright position, and in the case of bicycles the rider may mount the machine while in its sustained upright position and also slow down to a standing position without the machine falling. It will be understood that the space or distance providing the transverse degree of separation between the tires F may be varied in accordance with the required circumstances.

I do not desire to restrict myself to the specific details of form or construction as herein shown and described, it being manifest that variations and modifications may be made without departing from the spirit and scope of my invention. I therefore reserve the right to all such variations and modifications in the detail features of construction and arrangement as properly fall within the spirit of my invention and improvements and the terms of the following claims.

Having fully described my invention, I claim as new and desire to secure by Letters Patent—

1. A wheel of the class described, comprising a rim having its middle or central portion arched or concaved toward the hub or bearing and formed of the inner and outer metallic plates, said plates being converged at their outer ends and conjointly forming at said outer ends the concave seats adapted to receive and carry projecting tread-tires, whereby said bridge or span of the rim between the two outer tread-surfaces is strengthened against buckling, substantially as and for the purpose set forth.

2. A wheel of the class described, comprising a rim having its middle or central portion concave toward the hub or bearing, and formed of the inner and outer metallic plates, said plates being converged at their end portions, and carrying conjointly at their end portions concave seats adapted to receive and carry the projecting tread-tires, whereby the bridge or span of the rim between the two outer tread-surfaces is strengthened against buckling, substantially as shown and described.

In testimony that I claim the foregoing as my invention I have signed my name, in presence of the subscribing witnesses, this 27th day of February, 1900.

WILLIAM RICHES.

Witnesses:
FRANK HUMPHRY,
HERBERT LONGSTAFFE WEBB.